United States Patent [19]
Kunz

[11] 3,912,573
[45] Oct. 14, 1975

[54] APPARATUS FOR PRODUCING CORE MATERIAL FOR HONEYCOMB PANELS

[76] Inventor: Bernard P. Kunz, 4981 S. Clarkson St., Englewood, Colo. 80110

[22] Filed: Feb. 11, 1974

[21] Appl. No.: 441,237

Related U.S. Application Data

[63] Continuation of Ser. No. 166,817, July 28, 1971, abandoned.

[52] U.S. Cl. ............... 156/471; 156/499; 156/512; 156/551; 156/578
[51] Int. Cl.[2] ..................... B31F 1/24; B32B 31/12
[58] Field of Search .......... 156/205, 207, 210, 260, 156/271, 285, 289, 292, 462, 469, 471, 472, 473, 470, 499, 501, 517, 537, 512, 551, 578; 198/59, 60

[56] References Cited
UNITED STATES PATENTS

| | | | |
|---|---|---|---|
| 2,051,296 | 8/1936 | Goettsch | 156/473 |
| 2,055,877 | 9/1936 | Palmer | 156/473 |
| 2,068,155 | 1/1937 | Swift, Jr. | 156/473 |
| 2,475,789 | 7/1949 | Kunz | 156/499 |
| 2,714,340 | 8/1955 | Brown | 156/470 |
| 3,026,231 | 3/1962 | Chavannes | 156/205 |
| 3,481,830 | 12/1969 | Hanke | 156/462 |
| 3,508,992 | 4/1970 | Chavannes | 156/205 |
| 3,655,475 | 4/1972 | Stelling, Jr. et al. | 156/260 |
| 3,655,476 | 4/1972 | Siegal | 156/260 |
| 3,700,523 | 10/1972 | Sato et al. | 156/210 |
| 3,708,361 | 1/1973 | Stumpf | 156/210 |

*Primary Examiner*—Charles E. Van Horn
*Assistant Examiner*—Basil J. Lewris
*Attorney, Agent, or Firm*—Sheridan, Ross & Fields

[57] ABSTRACT

Method comprises supplying a continuous web of felted fibrous material, such as fiber glass, continuously impregnating the web at a first station with a suitable resin, feeding the web step by step to a forming station, arranging it in laterally corrugated form, and carrying it through a heat curing zone to rigidify the resin and set the corrugations. Second, generally plane, cured web of the same material is overlaid on the crests of the corrugations and continuously carried through the curing zone to bond the two members into single faced corrugated board. Combination is split into multiple elongate strips which are rotated 90° on their longitudinal axes to stand on edge and are bonded together to form a honeycomb core.

Machine includes impregnator to apply resin to first web, oscillating feeder device to transfer successive portions of web to forming station, and generally horizontal corrugating belt moving downstream from forming station through curing zone. Endless belt of "non-stick" material, such as Teflon, very thin and flexible, is arranged to underlie wet web and support it against tension failure. Belt and overlying web are pulled down into corrugations by vacuum box which underlies corrugating belt at forming station, and they remain in such position through curing zone, after which Teflon belt is stripped away. Upper section of machine feeds similar web past applicator and through a second curing zone and then feeds second web onto first web for bonding. Slitting and rotating section has adjustable devices to arrange arches of strips in desired registry.

7 Claims, 6 Drawing Figures

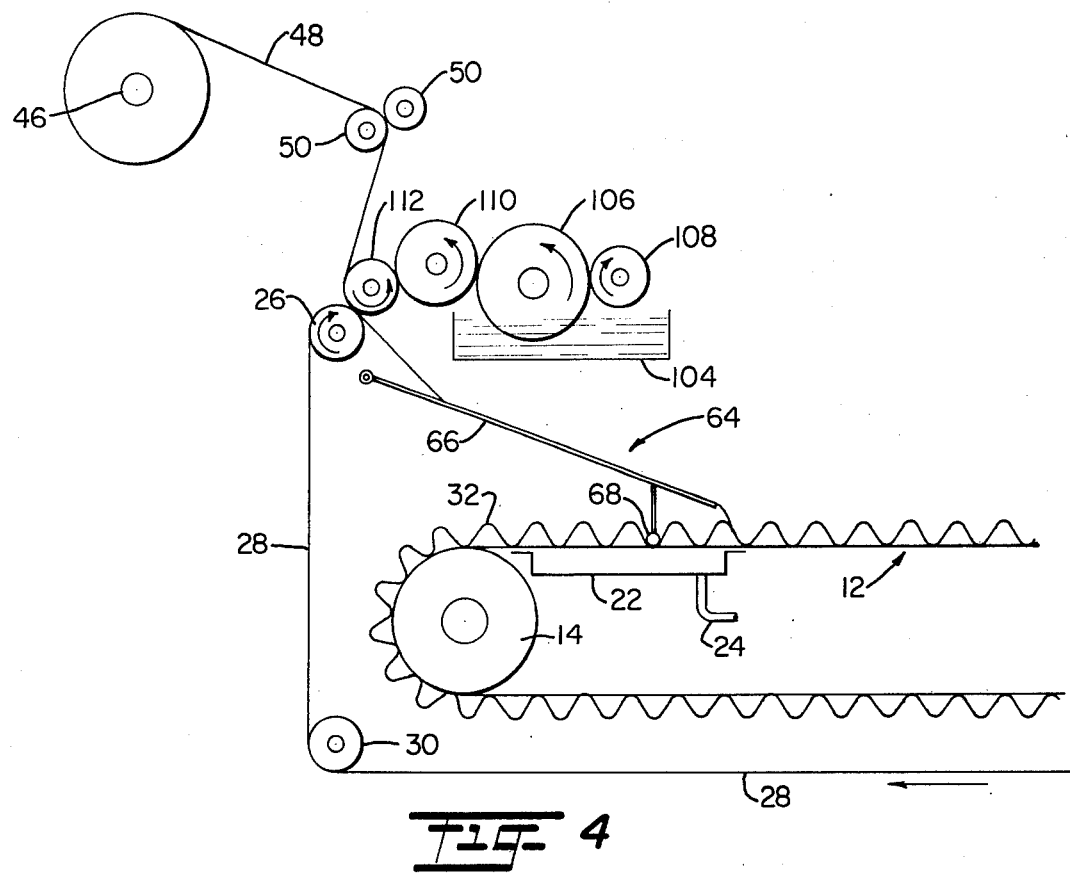
FIG. 4
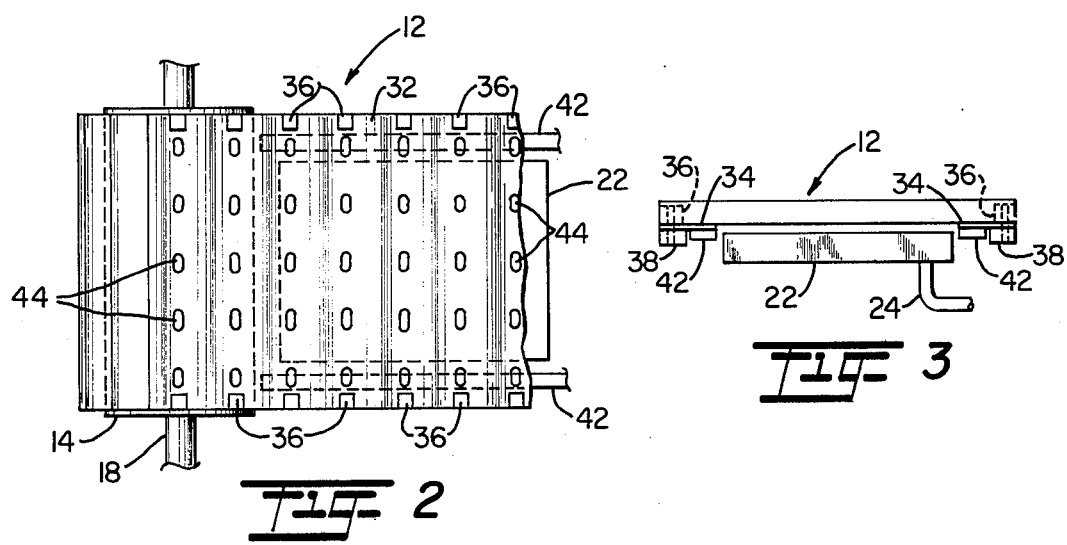
FIG. 2
FIG. 3

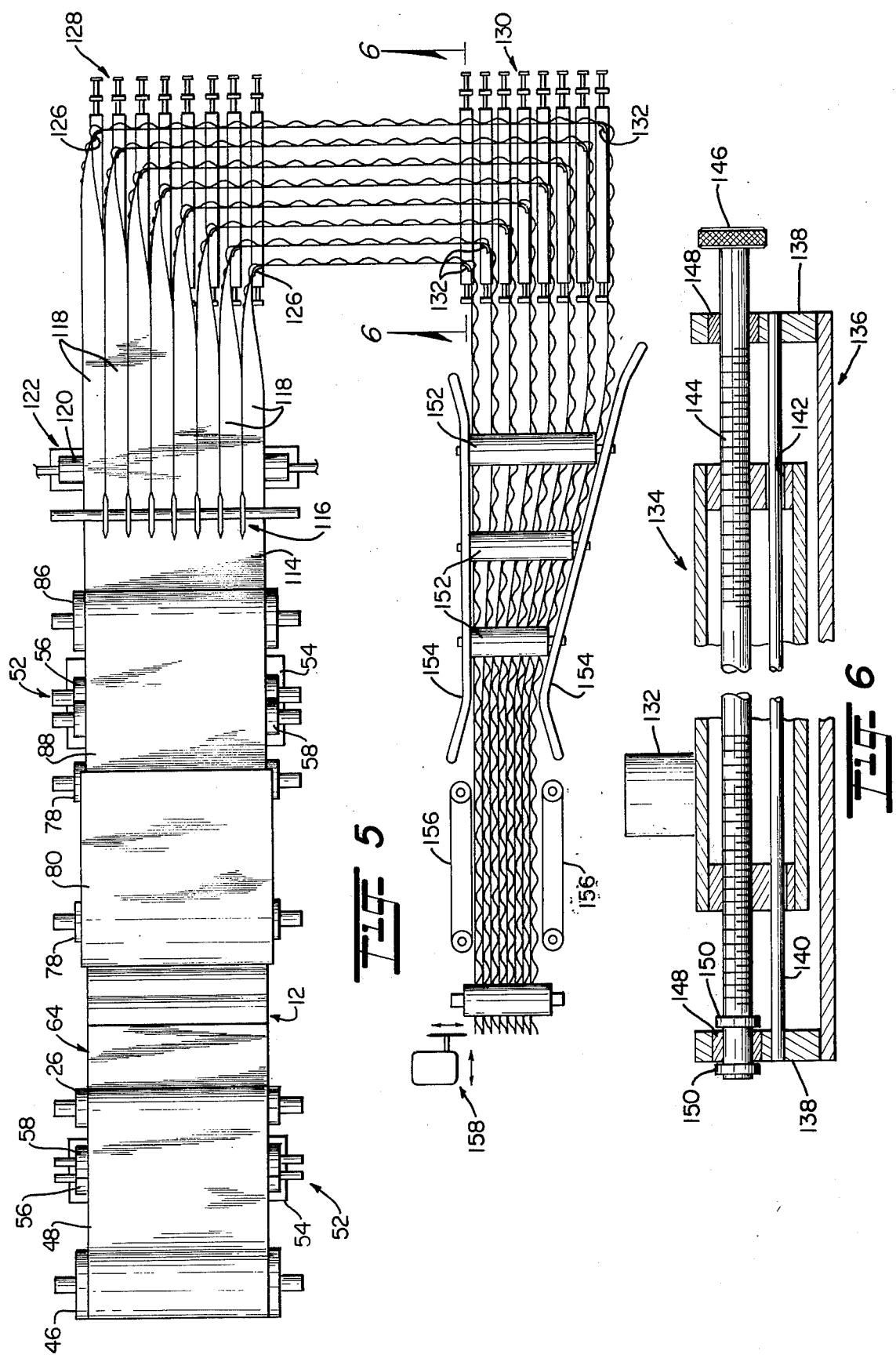

APPARATUS FOR PRODUCING CORE MATERIAL FOR HONEYCOMB PANELS

This is a continuation of U.S. application Ser. No. 166,817 filed July 28, 1971, now abandoned.

BACKGROUND OF THE INVENTION

This invention lies in the field of method and apparatus for producing components used in the construction of honeycomb panels and is directed to such method and apparatus which will operate continuously to produce unitary components which may be cut to desired lengths at various stages in the operation.

Many types of apparatus have been proposed and constructed for producing the elements and subcombinations used in building up honeycomb panels in their final form, ready for use. In one type, strips of paper or other base material are provided with adhesive on appropriate areas, then pressed together in a solid block and bonded by heat and pressure, and thereafter pulled apart to form an expanded core of generally hexagonal cells extending through the thickness of the core. In some cases the process is continuous, while in others the semifinished material must be removed from one machine and placed in another to complete the process.

In another type a single faced corrugated board is made up in much the same way as the wall materials for cardboard boxes by forming longitudinal corrugations in a continuous web of paper or other material and adhering a flat sheet thereto. This board must be taken from the first machine and cut up laterally into multiple strips, stood on edge, and bonded together.

Still another type uses a reel of elongate, laterally corrugated web material which has been formed on another machine, and faces one or both sides with a plane web. This material must then go to at least one more machine where it is cut in suitable pieces, turned on edge, and bonded together.

Each of these machines are designed to handle preformed material for making panels and are not designed to handle raw materials from which structural elements are manufactured and assembled in a continuous operation.

SUMMARY OF THE INVENTION

The present invention overcomes the various shortcomings of the prior arrangements and provides a relatively simple and highly reliable method and apparatus which continually processes material from its raw state to form a finished core ready for application of panel facings.

Generally stated, in its presently preferred form, the apparatus which is used in the practice of the method includes an endless corrugating belt mounted on a pair of spaced rollers and arranged in a generally horizontal plane and driven by one or both of the rollers. A forming station is defined adjacent to a first roller, from which an upper pass of the belt travels downstream through a curing zone or chamber provided with any suitable heating source. At the forming station a vacuum box underlies the upper pass of the belt and continuously pulls air down through apertures in each of the troughs of the corrugations.

A supply reel feeds a continuous web of felted fibrous material, such as fiber glass, past a resin impregnator and over a support roller, and on to the forming station. A support belt, extremely thin and flexible and having high resistance to adhesion by other materials, such as Teflon, is formed as an endless loop. It overlies the upper pass of the corrugating belt and passes in spaced relation around the lower pass, up and over the support roller, and down to the forming station. The support belt passes over the support roller beneath the impregnated web and underlies the latter through the forming and curing process. The belt has a dual purpose. When the web is wetted with the resin, the fibers become free with respect to each other and the weight of the web tends to pull them apart and cause disintegration of the fibrous mat. The support belt is thin but very strong and adequately supports the web during its transfer to the forming station. The purpose of the vacuum box is to pull the web down into the corrugating formations but it cannot do so with the web alone because it is porous. However, the support belt is imperforate and is readily pulled down by the vacuum box. The web adheres to the belt because of the wetting action of the resin and hence it is also drawn down into the formations.

The corrugations in the belt and web are formed by what might be called a draping action. For this purpose, a reciprocating feeder device is provided. The feeder rises and falls as a cam follower attached to it engages successive formations of the moving corrugated belt. It continually receives successive portions of the lengths of the support belt and web and feeds them step by step into the troughs of the corrugations where they are pulled down snugly by the vacuum box. As the support belt and web pass through the curing zone, the web gradually rigidifies and its corrugations become set. At the exit station the support belt is directed away from the web and separates readily because of its non-stick character.

A second supply reel carries a second continuous length of the same type of web which is fed past a resin impregnator and through a heated curing chamber carried by another support belt. The cured web is then fed onto the upper surface of the first web downstream of the forming station and is bonded to the crests of its corrugations during the curing of the first web.

The single faced board may be handled in various ways after it leaves the exit station. In the apparatus of the present invention, a slitter cuts the board into a plurality of narrow strips extending in the direction of the longitudinal axis of the board. The crests of the corrugations are wetted with adhesive resin and the strips are rotated 90 degrees about their longitudinal axis to stand them on edge. Then they are re-directed laterally twice about upstanding guides. The second set of guides is individually adjustable to provide the desired lateral registry of the arches of the strips. The strips are then brought together laterally and bonded into a continuous core member. The core member may be cut to desired lengths at this time or remain unitary to enter a facing machine.

BRIEF DESCRIPTION OF THE DRAWINGS

Various other advantages and features of novelty will become apparent as the description proceeds in conjunction with the accompanying drawings, in which:

FIG. 2 is a schematic fragmentary plan view taken on the line 2—2 of FIG. 1;

FIG. 3 is a schematic sectional view taken on line 3—3 of FIG. 1;

FIG. 4 is a schematic side elevational view of an alternate resin impregnator;

FIG. 5 is a schematic plan view of the second section of the apparatus; and

FIG. 6 is a schematic sectional view taken on line 6—6 of FIG. 5.

DESCRIPTION OF PREFERRED EMBODIMENTS

Figure 1:
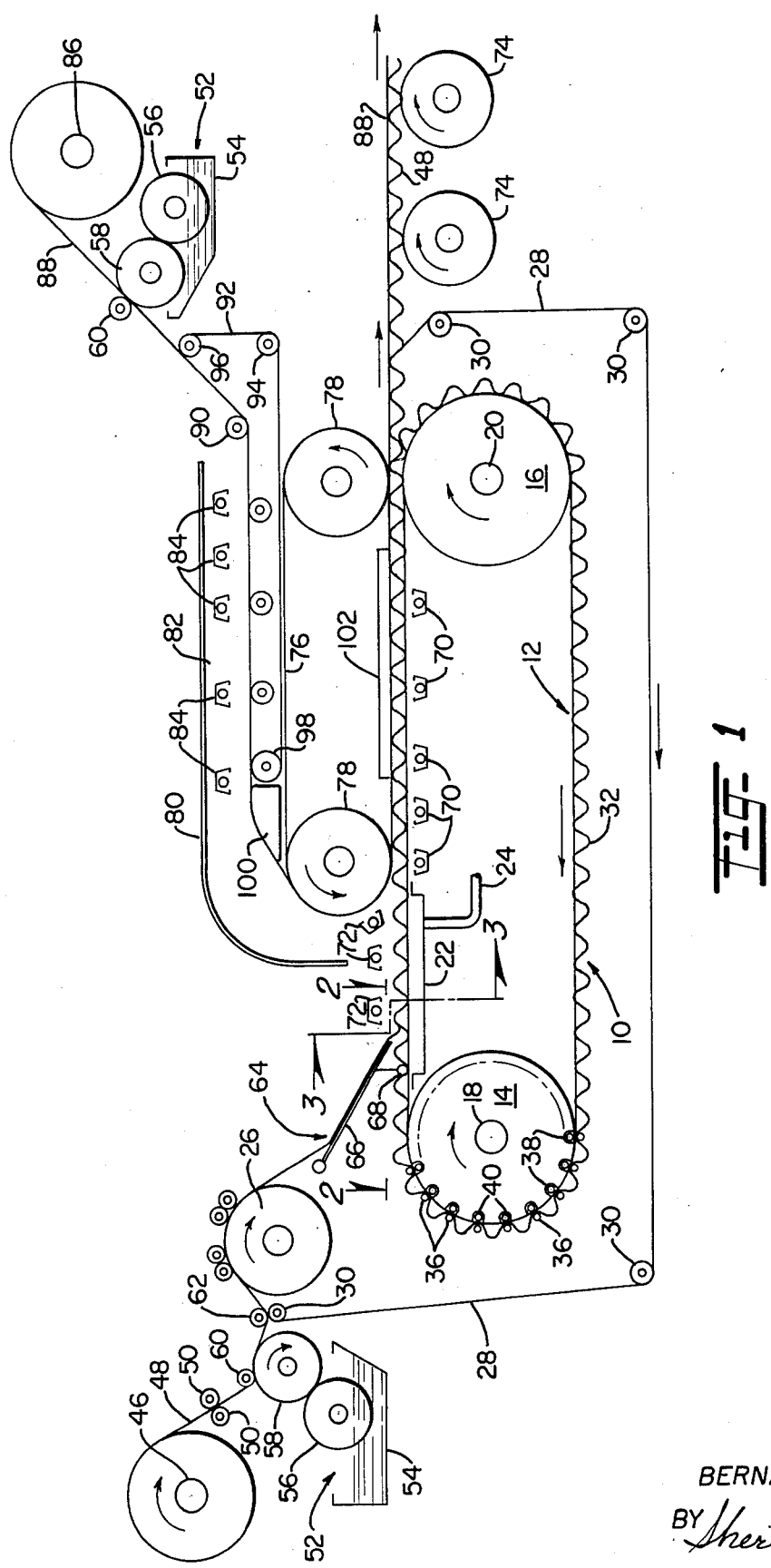
FIG. 1 is a schematic side elevational view of the first section of the apparatus of this invention.

A typical example of the apparatus used in the practice of the invention is illustrated in FIG. 1, in which a corrugator 10 comprises a corrugating belt 12 in the form of an endless loop surrounding and mounted on two longitudinally spaced support members, each of which consists of a roller 14, 16 mounted for rotation on horizontal axles 18, 20. The belt is shown as having upper and lower passes lying in horizontal planes but the passes may be angled up or down to some extent without changing the mode of operation.

The zone immediately downstream of roller 14 is the forming station, and a vacuum box 22, connected to a vacuum source by pipe 24, underlies the major part of the width of the corrugating belt and extends longitudinally under several corrugations for a purpose to be explained later.

A support roller 26 is located in a supply zone above and upstream from the forming station. A support belt 28 is formed as an endless loop overlying the corrugating belt from the forming station to the exit station downstream of roller 16, and then extending in spaced relation down beyond roller 16, back and around roller 14, up and over support roller 26 and down to the forming station. Its path of travel is controlled by guide rollers 30 and support roller 26. The belt is imperforate and very thin and flexible as well as strong, and is preferably made of Teflon of the order of 0.002 to 0.005 inch thick. Teflon is presently preferred because of its very high resistance to adhesion by other materials, but any other belt with suitable qualities may be used.

The general details of the corrugating belt, its supporting rollers, and the vacuum box are shown in FIGS. 1, 2, and 3. The basic belt is a strip of metal, preferably stainless steel, provided with uniform corrugations 32 throughout its circumference in generally sinussoidal form. To prevent distortion of the corrugations and to provide smooth sliding action, a strip runner 34, also preferably of stainless steel, is provided at each margin of the belt on the inner side of the corrugations and is secured to the belt by a plurality of fasteners, each comprising a short cylindrical rod 36 lying in the trough and a similar rod 38 underlying the runner, the two being connected by suitable means such as Rol-pins. The inner rods are adapted to engage in driving formations comprising recesses 40 in the surface of roller 14 which is driven by any suitable power means. Roller 16 may have similar formations and be driven in synchronism with roller 14. Low friction tracks 42 extend between rollers 14 and 16, and runners 34 slide on these tracks to maintain the upper pass of the corrugating belt planar.

Apertures 44 are formed in each of the troughs of belt 12, and vacuum box 22 underlies the major part of the width of the belt as well as having a substantial longitudinal extent. As successive portions of the length of belt 12 pass over the vacuum box, the latter continuously draws air down through the apertures for a purpose to be described.

Supply reel 46 carries a continuous web 48 of fibrous mat material such as fiber glass which is fed by drive rolls 50 across a resin applicator or impregnator 52 to support roller 26. The applicator includes a reservoir 54 of a thick syrupy resin, a pickup roll 56, a transfer roll 58, and a pressure roll 60. One of the features of the invention is that the transfer roll not only applies resin to the underside of the web but also forces it through the web to the upper side to completely saturate it. The relatively fine mesh of the felted web acts as a sieve to strain the resin and prevent the formation of bubbles which would interfere with subsequent operations.

Another pressure roll 62 cooperates with guide roller 30 to press the web onto the upper surface of support belt 28 and the combination passes over support roller 26 and down to the forming station. In doing so, the belt and web slide over feeder mechanism 64 having an arm or laterally-extending plate 66 and a cam follower 68. As the follower drops down into a trough, the lower end of plate 66 drapes the belt and web down into a trough over the vacuum box and they are pulled snugly into place. As the cam follower rides up to the next crest, plate 66 rises but does not pull the belt out of the trough because of the vacuum. Instead the arm slides upward relative to the belt and web to gather another portion to drape down into the succeeding trough. This step by step operation continues as long as the apparatus is running.

A series of heat lamps 70 located beneath the upper pass of belt 12 transmit sufficient heat to and through belt 12 and belt 28 to cure the web by the time it reaches the exit station. If desired, preheat lamps 72 may be located at the forming station. Although the resin is an adhesive by nature it does not bond to the Teflon belt 28. Therefore, the latter readily strips off the cured web at the exit station to travel over rollers 30 back to support roller 26. The web 48 travels over guide rollers 74 to the next operation.

It will be observed that the apparatus described up to this point represents a complete machine for producing rigid corrugated web material suited for a variety of uses. However, to reduce the number of stages in the production of a finished panel, the apparatus of FIG. 1 also prepares and bonds a plane web to the corrugated web to produce a single faced board.

For this purpose the upper portion of the apparatus includes a second stainless steel belt 76 trained over a pair of support rollers 78. One or both rollers may be driven and any suitable drive connection may be made between the rollers and the belt. An insulated shield 80 spaced above the upper pass of the belt forms a curing chamber 82 equipped with heat lamps 84. A second supply reel 86 carries a continuous web 88 of fibrous material which is the same as web 48. The web is fed through a similar impregnator 52 and passes under a guide roller 90 to travel generally horizontally through curing chamber 82 and engage belt 76 at the roller 78 adjacent to the forming station.

Again a Teflon or the like belt is provided to support the resin-weakened web and to hold it out of contact with the steel belt to which it would adhere before it is completely cured. Belt 92 is trained over rollers 94, 96, 98 to pick up the web adjacent to the impregnator and carry it through the curing chamber well above the steel belt. In some applications it may be possible to omit rollers 94, 96 and 98 and just fold the Teflon belt back upon itself. A guide 100, which may be solid Teflon or Teflon coated, is located just beyond roller 98 to transfer web 88 to steel belt 76. The cured web 88 passes around roller 78 and is brought in contact with the uncured corrugated web 48 to become bonded to it as the two webs proceed to the exit station. A pressure plate 102 urges belt 76 down against web 88 to insure good contact during bonding. A pressure of 6 to 8 psi has been found to be satisfactory. The plate may be held down by its own weight or by an air pressure chamber of conventional design.

Conveniently, the resin is a fiber glass reinforced polyester resin which contains a promoter and either a catalyst which works with heat, such as benzol peroxide, or a catalyst which works either with or without heat such as methyl ethyl ketone peroxide. The fiber glass mat is cured at a temperature of 200°–400°F for 30 seconds to 10 minutes. In the embodiment shown a curing temperature of 250°–350°F for 5 to 7 minutes has been found satisfactory. The apparatus shown can be constructed to have a length of 35 feet along which the fiber glass mats impregnated with resin move at a linear speed of 5 to 7 feet per minute.

An alternate form of impregnator may be used when the resin is thinner and more watery. As seen in FIG. 4, it includes a reservoir 104, a pickup roll 106, a doctor roll 108, and a pair of transfer rolls 110 and 112. Transfer roller 110 is driven in the same direction as pickup roller 106 to wipe resin therefrom which in turn is wiped off by transfer roller 112, also driven in the same direction, the latter applying the thin resin to the upper side of web 48. Because of its lower viscosity the resin will penetrate the entire depth of the web by gravity and by its wetting action.

The second section of the apparatus is provided to transform the product of the first section from a continuous single faced board to a continuous length of honeycomb core ready for the application of facings to produce finished panels. The apparatus shown in FIG. 5 is similar to that disclosed in the patent to Bernard P. Kunz, U.S. Pat. No. 2,475,789, issued to the inventor herein on July 12, 1949. Reference may be had to that patent for details not fully shown herein. The novelty of the present apparatus lies in the provision of guide means which are individually adjustable to produce a desired lateral alignment of the corrugations in the core material for any size of corrugation.

As seen in FIG. 5, the single face corrugated sheet 114 leaves the exit station of the first section of the apparatus and passes under a slitter 116 which divides it into a plurality of individual strips 118. As these strips pass over the roller 120 of an applicator 122 the crests of their corrugations are wetted with the same resin used in prior stages. Each strip is then twisted 90° about its longitudinal axis and then re-directed laterally by means of a set of guides 126, which form part of a first guide mechanism 128.

The strips then travel to a second guide mechanism 130 having guides 132 to again re-direct the strips to travel parallel but opposite to their original flow path. The guides 126 and 132 are generally arc-shaped and contact only the plane sides of the strips so that the adhesive on the corrugation crests is not disturbed. It will be noted that these guides are spaced laterally and longitudinally so that the various strips are maintained in spaced relation as they travel through the two turns.

It is desirable for the best results to arrange the strips before bonding so that the corrugations are in lateral alignment with the crests of all strips in registry or with the crests and troughs of adjacent strips in registry. This is accomplished by making the guides 132 individually adjustable, preferably in the direction of final travel as shown. For this purpose each guide is mounted on a carriage 134 which in turn is slidably mounted on a base 136 having upstanding end walls 138. A guide rod 140 extending between the end walls is slidable in apertures 142 in the carriage. A threaded control rod 144 having a knob 146 is rotatably mounted in the end walls in bearings 148, and rings 150 prevent axial movement. The control rod is threaded in carriage 134 so that its rotation moves the carriage longitudinally to desired position while guide rod 140 maintains the carriage upright. Since each guide 132 may be individually adjusted, it is possible to set each strip with its corrugations in the desired position with respect to the others, and the relative positions will remain the same as long as the apparatus is operating.

After the strips are properly aligned they pass between upper and lower rolls 152 which maintain their planar formation and between converging guide members 154 which bring the crests and flat strips into contact for bonding. The compacted assembly is then moved onward by a pair of drive belts 156, which may be located in a heated curing chamber, not shown. A cut-off mechanism 158 having a longitudinally and laterally traveling saw may be located downstream of the curing chamber to cut the assembly into core sections of desired length, or the continuous core material may travel on to a facing machine. Details of the cut-off mechanism are fully disclosed in U.S. Pat. No. 2,475,789, previously mentioned.

If desired, the guides 126 may be mounted for longitudinal adjustment in the same way as guides 132 to further facilitate the corrugation alignment, as indicated in FIG. 5.

It will be apparent that methods and apparatus have been disclosed herein for taking raw base materials and processing them in a continuous operation to produce corrugated strip, single faced corrugated board, or honeycomb cell type core material ready for facing to make finished panels.

What is claimed is:

1. Apparatus for producing core material for honeycomb panels from a web of porous fibrous material, comprising:

a corrugator including a pair of longitudinally spaced support members and a corrugating belt, the belt being in the form of an endless loop surrounding the support members and having an upper pass and a lower pass and being provided with a multiplicity of corrugating formations extending outwardly and laterally from side to side of the belt and being uniformly spaced along the length of the belt;

apertures formed in the troughs of the corrugating formations;

a forming station adjacent to the first support member;

a vacuum box at the forming station located below the upper pass of the belt and operating to draw air continuously through the overlying apertures in the belt;

an imperforate support belt in the form of an elongate endless loop of thin, flexible material arranged to overlie the upper pass of the corrugating belt above the vacuum box at the forming station;

means for supplying a first continuous web of porous fibrous material to the support belt to overlie and travel with the support belt;

a first impregnator to apply liquid resin to the fibrous web prior to contact with the support belt;

a reciprocating feeder device underlying the support belt at the forming station to advance and feed successive portions of the support belt and fibrous web into successive corrugating formations on the corrugating belt;

means to move the corrugating belt, the support belt, and the porous fibrous web simultaneously along the corrugator from the forming station to an exit station adjacent to the second support member, so that the vacuum box can pull successive portions of the length of the support belt and the overlying porous fibrous web down into the troughs of the corrugating formations at the forming station to corrugate the web; and first heating means between the forming station and the exit station to cure the fibrous web and set its corrugations as it proceeds to the exit station.

2. Apparatus as claimed in claim 1, the feeder device including:
a cam follower engaging successive formations on the corrugating belt to cause its reciprocation.

3. Apparatus for producing core material for honeycomb panels from a first uncured corrugated web of porous fiberglass material and a second cured flat web of fiberglass material, the apparatus comprising:

a corrugator including a pair of longitudinally spaced support members and a corrugating belt, the belt being in the form of an endless loop surrounding the support members and having an upper pass and a lower pass and being provided with a multiplicity of corrugating formations extending outwardly and laterally from side to side of the belt and being uniformly spaced along the length of the belt;

apertures formed in the troughs of the corrugating formations;

a forming station adjacent to the first support member;

a vacuum box at the forming station located below the upper pass of the belt and operating to draw air continually through the overlying apertures in the belt;

an imperforate support belt in the form of an elongate endless loop of thin, flexible material mounted for movement along an endless path which is greater in length than the path of said corrugating belt and arranged to overlie the upper pass of the corrugating belt above the vacuum box at the forming station during travel along only a portion of its path;

means for supplying a first continuous uncured web of porous fiberglass material to said support belt to be carried by said support belt from a point spaced from said corrugated belt and thereafter to overlie and travel with the support belt across the upper pass of said corrugated belt;

a first impregnator to apply liquid resin to the first uncured fiberglass web just prior to being contacted with and supported by the support belt;

means to move the corrugating belt, the support belt, and the resin impregnated fiberglass web simultaneously along the corrugator from the forming station to an exit station adjacent to the second support member, so that the vacuum box can pull successive portions of the length of the support belt and the overlying resin impregnated fiberglass web down into the troughs of the corrugating formations at the forming station to corrugate the web;

first heating means between the forming station and the exit station located to heat the upper pass of said corrugated belt to cure the first resin impregnated fiberglass web and set its corrugations as it proceeds from the forming station to the exit station;

means for supplying a second continuous web of uncured fiberglass material a second impregnator having means to apply liquid resin to the second uncured fiberglass web;

a second heating means to cure the second resin impregnated fiberglass web;

transport means to carry the second web past said second heating means; and means to continuously feed the second, cured web onto the first, uncured, corrugated resin impregnated web between said forming station and said exit station while said first web is supported by said corrugator to cause the second cured web to be bonded to the first uncured web by curing of the latter by said first heating means after the first and second webs are in contact to form a single-faced corrugated board.

4. Apparatus as claimed in claim 3, wherein the impregnator includes:
a resin applying means arranged to apply the resin to the side of the web to come in contact with the support belt and force it through the web to the opposite side to assure that the web is thoroughly impregnated with the resin.

5. Apparatus as claimed in claim 3, wherein:
the support belt is formed of a high melting point plastic extremely thin and flexible to allow it to be drawn readily into the formations of the corrugating belt by the vacuum box and highly resistant to adherence by other materials.

6. Apparatus as claimed in claim 5, wherein:
the material of the support belt is polytetrafloraethylene having a thickness on the order of 0.002 to 0.005 inch.

7. Apparatus as claimed in claim 3, further including:
splitter means downstream of the exit station to divide the bonded webs into narrow elongate strips;

a resin applicator to apply resin to the crests of the corrugations;

a first guide mechanism to rotate each strip 90° about its longitudinal axis to place all of the strips on edge and to re-direct their path of travel at an angle to their original path of travel;

a second guide mechanism to re-direct their path of travel at a further angle to their second path of travel, the second guide mechanism being provided with guide members which are adjustable to cause the corrugations of the various strips to assume an alignment wherein the crests of adjacent corrugations are aligned; and means bringing said aligned strips into engagement to form a finished panel core.

* * * * *